United States Patent [19]
Voehringer, Jr.

[11] 3,854,750
[45] Dec. 17, 1974

[54] RETRACTABLE SUPPORT FOR MOBILE CAMPERS AND THE LIKE

[76] Inventor: Carl Voehringer, Jr., 2 Wedger Rd., Spencerport, N.Y. 14559

[22] Filed: Jan. 15, 1973

[21] Appl. No.: 323,625

[52] U.S. Cl. .......................... 280/150.5, 254/86 R
[51] Int. Cl. .............................................. B60s 9/02
[58] Field of Search....... 280/150.5; 254/86 R, 86 H

[56] References Cited
UNITED STATES PATENTS

| | | | |
|---|---|---|---|
| 1,891,517 | 12/1932 | Williams.......................... | 280/150.5 |
| 2,840,391 | 6/1958 | Stiel................................ | 280/150.5 |
| 3,345,038 | 10/1967 | Taylor.............................. | 280/150.5 |
| 3,565,396 | 2/1971 | Spear............................... | 254/86 R |

*Primary Examiner*—Robert R. Song
*Attorney, Agent, or Firm*—Shlesinger, Fitzsimmons & Shlesinger

[57] ABSTRACT

Each support, two of which are adapted to be used on a camper, comprises an inverted channel iron disposed transversely beneath one end of a camper, a pair of operating screws rotatably journaled in opposite ends of the channel iron, and a pair of blocks adjustable on said screws between the sides of its channel iron. A pair of legs is pivoted to the channel iron and a link pivotally connects each leg with one of the blocks. The legs can be lowered by rotating each screw in one direction, and can be retracted to folded positions by rotating the screws in the opposite direction.

2 Claims, 3 Drawing Figures

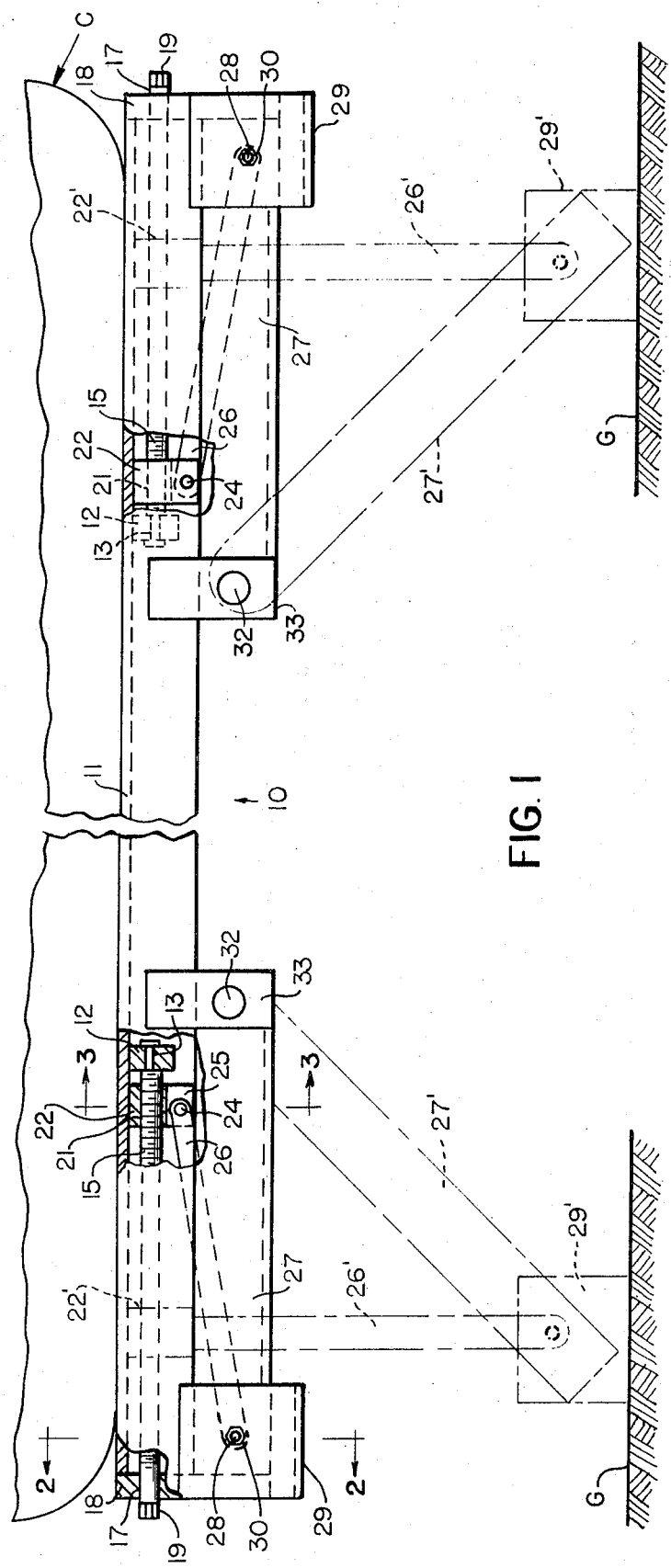

RETRACTABLE SUPPORT FOR MOBILE CAMPERS AND THE LIKE

This invention relates to mobile campers, trailers, and the like, and more particularly to a retractable mechanism for supporting a camper or trailer, when parked.

With more retirees and vacationers taking to over-the-road sight seeing or camping vacations, automobile-drawn campers and trailers have become extremely popular. It has become desirable, therefore, to provide such campers or trailers with supports or jacks, which can be employed to support the camper or trailer when a destination has been reached, or when the camper or trailer is otherwise not in motion. Such supports as have been provided heretofore for this purpose have, however, been difficult to operate, have been expensive, and, moreover, have been unreliable.

It is an object of this invention to provide an improved, retractable camper support, which is substantially more reliable and easier to operate than prior such supports.

Still another object of this invention is to provide a novel camper support which can be fastened to the underside of a camper to be readily accessible from opposite sides of the camper to effect its rapid extension or retraction, and which can easily be stored out of the way when the vehicle, to which the support is attached, is in motion.

Another object of this invention is to provide an improved camper support of the type described which includes retractable legs adjustable independently of each other so that the camper can be supported more readily on uneven terrain.

A further object of this invention is to provide a camper support the important operating parts of which are sheltered from the mud, dust, stones, etc. when the support is in its retracted or inoperative state.

Other objects of this invention will be apparent hereinafter from the specification and from the recital of the appended claims, particularly when read in conjunction with the accompanying drawing.

In the drawing:

FIG. 1 is a fragmentary elevational view of a camper support made according to one embodiment of this invention, the retractable legs of the support being shown in full lines in their retracted positions, and in broken lines in their extended or operative positions;

FIG. 2 is a cross-sectional view of this support taken along the line 2—2 in FIG. 1 looking in the direction of the arrows;

FIG. 3 is a cross-sectional view taken along the line 3—3 in FIG. 1 looking in the direction of the arrows.

Referring now to the drawing by numerals of reference, 10 denotes generally a camper support comprising an elongate, inverted channel iron or beam 11, which is fastened in any desired manner beneath the underside of a camper C to extend transversely between opposite sides thereof. No special brackets are needed. The support can be mounted directly to the beam frame of the camper or trailer. Because of this the support can readily be removed from one camper or trailer and fastened to another one, should the owner, for instance, trade one camper or trailer in for another. Riveted or otherwise fastened to the underside of channel 11 between its side walls, and at points equispaced inwardly from opposite ends thereof, are two spaced bearings 12. Rotatably journaled in opposite end plates 18 of channel 11 in axial alignment with each other are two, elongate operating screws 15, the inner ends of which rotate in aligned bores 13 in bearings 12. The outer ends of these screws project outwardly through the openings 17 in the end plates 18 in which they are journaled; and on its outer end each screw 15 has a hex head 19 by which it can be rotated by a conventional hex wrench.

Intermediate its ends each screw 15 threads into the internally threaded bore 21 of a slide block 22, which is slidably mounted between opposite sides of channel 11. Each block 22 has a pair of downwardly projecting legs 25 which carry a transverse pin 24. Pivotally connected at one end to each pin 24 is a link 26. At its opposite end each link 26 is pivotally connected to a channel-shaped leg member 27 by a bolt 28, which extends transversely between opposite sides of the leg 27 parallel to pins 24. Each bolt 28 also serves as a pivot for a stirrup or generally U-shaped foot 29, which nests over the adjacent end of the leg and is secured by nut 30 on each bolt 28. At its inner end each leg 27 is pivotally connected by a pin 32 to a pair of plates 33 that are welded or otherwise secured to opposite sides of channel 11. Pins 32 are parallel to pins 24 and 28.

Normally two supports 10 are provided for a camper C, one at the front and the other at the rear of the camper.

On the road the legs 27 are folded under the floor of the camper as shown in full lines in FIG. 1. To lower the legs 27 of a support when a campsite, for instance, is reached, the screws 15 are rotated, to shift the blocks 22 outwardly. This causes the links 26, legs 27 and associated feet 29 to be swung downwardly to the broken line positions 26', 27' and 29' in FIG. 1, or at least until the feet 29 are seated on the ground G. Because the feet 29 are pivotally mounted on the associated legs 27, the feet can always pivot into their upright positions (29' in FIG. 1) and seat firmly on the ground.

To retract the legs 27 to their inoperative positions, the operator need only rotate the screws 15 in the required direction.

While the wheels of the associated camper C have not been illustrated, it will be apparent that each support 10 is designed so that when the legs 27 are in their fully lowered positions, the camper wheels will be elevated slightly from the ground G to remove the weight of the camper from its wheels. The clearance between the wheels and the ground will then allow for some slight adjustment of the retractable supporting legs to place the camper horizontally if the terrain is not completely level.

From the foregoing it will be apparent that the instant invention provides relatively simple and inexpensive means for readily converting a camper or trailer from mobile operation to immobile, and vice versa. Simply by rotating the associated operating screw 15, in one direction, or the other, the supporting legs 27 can be lowered or elevated. Since each leg 27 can be adjusted independently of the others, it is possible to support the camper or trailer horizontally in spite of the unevenness of the terrain at a campsite. Moreover, although the pivotally mounted feet 29 normally tend to swing upright, when lowered to operative position as shown by broken lines in FIG. 1, nevertheless, since they are pivotally mounted relative to their associated support legs 26, 27, they too can assume other positions in which, for example, the bottoms thereof are slightly inclined to the horizontal, when necessary because of uneven terrain. Furthermore, when the pivotally mounted feet 29 are in their retracted positions, the overlap of each foot relative to the associated leg 27 and channel 11 helps lock the leg 27 in its closed position as shown in FIG. 2. Each foot 29 is channel or U-shaped and of a width across the channel to nest over and frictionally engage the outside surfaces of channel 11 as shown in FIG. 2.

Still a further advantage of this novel support is that when legs 27 are retracted, they close the bottoms of the channel in which screws 15 rotate, thus protecting the screws from road dirt, salt, etc., when the camper is being hauled over the road. The end plates 18 also help in this respect by blocking opposite ends of channel 11.

While the invention has been described in connection with one embodiment thereof, it will be understood that it is capable of further modification; and this application is intended to cover any embodiments of the invention that come within the scope of the invention or the limits of the appended claims.

Having thus described my invention, what I claim is:

1. A device for supporting a parked camper, comprising
   a beam adapted to be secured beneath a camper to extend transversely between opposite sides thereof,
   a pair of spaced operating screws, each of which is journaled at opposite ends, respectively, in a channel in said beam for rotation independently of each other about a common axis extending longitudinally of said beam, and each of which has a wrench-engageable head at its outer end,
   a nut threaded on each of said screws for axial movement in said channel when the associated screw is rotated,
   a pair of legs mounted on said beam to pivot about fixed parallel axes, extending transversely of said beam, the pivots for the two legs being disposed closer to one another than the inner ends of the two screws,
   a pair of links, each pivotally connected at one end to one of said nuts and at its opposite end to one of said legs, whereby, upon rotation of a screw in one direction, the associated leg is lowered to supporting position, and, upon rotation of the screw in the opposite direction, the associated leg is retracted.

2. A support for parked camper, comprising
   a channel iron beam open at its bottom, and adapted to be secured beneath a camper to extend transversely between opposite sides thereof,
   a pair of legs, each of which is a channel iron pivotally connected at one end to said beam to pivot about a fixed axis transverse of the length of the beam,
   a pair of slide blocks mounted to reciprocate in the underside of said beam in the channel thereof,
   a pair of links, each being pivoted at one end to one of said blocks and at its opposite end to one of said legs, the pivotal axes of said legs and links being parallel,
   two manually rotatable screws connected to said blocks and each journaled at its opposite ends in said beam and operable upon rotation to shift the associated block in the channel of said beam,
   each of said screws having a wrench-engageable head at its outer end,
   the pivots for the two legs being disposed inwardly of the inner ends of the two screws, and
   said links being operative to swing said legs downwardly to camper supporting positions, when said blocks are shifted in one direction, and being operative, when said blocks are shifted in the opposite direction, to swing said legs upwardly to folded positions in which each leg is positioned with its channel reversed with reference to the channel of said beam thereby to close the channel of said beam, and
   a foot member pivotally mounted on the free end of each leg to pivot about an axis parallel to the pivotal axis of said leg and nesting on said leg.

* * * * *